(12) United States Patent
Qian et al.

(10) Patent No.: US 11,225,057 B2
(45) Date of Patent: Jan. 18, 2022

(54) BONDED ARTICLE OF THIN GLASS ON SUPPORT SUBSTRATE, PREPARATION METHOD AND USE THEREOF

(71) Applicant: SCHOTT Glass Technologies (Suzhou) Co. Ltd., Jiang Su (CN)

(72) Inventors: Pengxiang Qian, Shanghai (CN); Chong Wang, Suzhou (CN); Feng He, Suzhou (CN); Yunfei Hou, Wuhan (CN); Rainer Liebald, Nauheim (DE)

(73) Assignee: SCHOTT GLASS TECHNOLOGIES (SUZHOU) CO. LTD., Jiang Su (CN)

( * ) Notice: Subject to any disclaimer, the term of this patent is extended or adjusted under 35 U.S.C. 154(b) by 737 days.

(21) Appl. No.: 14/975,900

(22) Filed: Dec. 21, 2015

(65) Prior Publication Data

US 2016/0114565 A1     Apr. 28, 2016

Related U.S. Application Data

(63) Continuation of application No. PCT/CN2013/077585, filed on Jun. 20, 2013.

(51) Int. Cl.
*B32B 17/06* (2006.01)
*B32B 43/00* (2006.01)
(Continued)

(52) U.S. Cl.
CPC ............... *B32B 17/06* (2013.01); *B32B 7/04* (2013.01); *B32B 9/005* (2013.01); *B32B 37/003* (2013.01);
(Continued)

(58) Field of Classification Search
CPC ..... B32B 17/06; B32B 3/266; B32B 2315/08; B32B 37/003
See application file for complete search history.

(56) References Cited

U.S. PATENT DOCUMENTS 6,735,982 B2   5/2004   Matthies
6,815,070 B1   11/2004  Bürkle
(Continued)

FOREIGN PATENT DOCUMENTS

CN    101063192 A    10/2007
CN    101176198      5/2008
(Continued)

OTHER PUBLICATIONS

International Search Report dated Mar. 27, 2014 for corresponding PCT/CN2013/077585, 3 pages.
(Continued)

*Primary Examiner* — William P Watkins, III
(74) *Attorney, Agent, or Firm* — Ohlandt, Greeley, Ruggiero & Perle, L.L.P.

(57) ABSTRACT

A method for making a bonded article, wherein a thin glass substrate is bonded on a support substrate in the absence of any interlayer by an electrostatic adhesion process with the assistance of external pressure, the pressure is applied constantly or stepwise during the adhesion process by use of a tool such as a roll or a wheel or other movable device with curved surface. The bonded article has no defects, e.g. bubbles or inclusions, in the bonded interface, which benefits transportation of the thin glass substrate and its post-processing as well. Such defect-free bonded article is also disclosed. Pressure supported electrostatic adhesion, initiated by electrostatic charges adhesion of a two members, e.g. a substrate member and a support member, is enabled to minimize, prevent and exclude defects, distortion between the adhered surfaces.

28 Claims, 11 Drawing Sheets

(51) Int. Cl.
  *B32B 37/00* (2006.01)
  *B32B 7/04* (2019.01)
  *B32B 9/00* (2006.01)
  *B32B 37/10* (2006.01)
  *B32B 38/10* (2006.01)

(52) U.S. Cl.
  CPC .............. *B32B 37/10* (2013.01); *B32B 38/10* (2013.01); *B32B 43/006* (2013.01); *B32B 2037/1063* (2013.01); *B32B 2255/20* (2013.01); *B32B 2310/025* (2013.01); *B32B 2315/08* (2013.01); *B32B 2457/08* (2013.01); *B32B 2457/10* (2013.01); *B32B 2457/16* (2013.01); *B32B 2457/206* (2013.01)

(56) References Cited

U.S. PATENT DOCUMENTS

| | | | |
|---|---|---|---|
| 7,379,696 | B2 | 5/2008 | Sawada et al. |
| 9,714,184 | B2* | 7/2017 | Merz .................... H02N 13/00 |
| 2002/0090509 | A1 | 7/2002 | Hsu et al. |
| 2003/0010062 | A1 | 1/2003 | Matthies |
| 2005/0001201 | A1 | 1/2005 | Bocko et al. |
| 2005/0250037 | A1 | 11/2005 | Sawada et al. |
| 2009/0110882 | A1 | 4/2009 | Higuchi |
| 2010/0096090 | A1 | 4/2010 | Yoshioka |
| 2011/0026236 | A1 | 2/2011 | Kondo et al. |
| 2011/0111194 | A1 | 5/2011 | Carre et al. |
| 2011/0268474 | A1 | 11/2011 | Shu et al. |
| 2012/0202010 | A1 | 8/2012 | Uchida |
| 2014/0340731 | A1* | 11/2014 | Strong .................... G02F 1/155 359/275 |
| 2015/0375492 | A1* | 12/2015 | Bigelow ............... C03C 23/009 428/119 |

FOREIGN PATENT DOCUMENTS

| | | |
|---|---|---|
| CN | 101787573 A | 7/2010 |
| CN | 102756527 | 10/2012 |
| JP | H1160849 | 3/1999 |
| JP | 2000241804 | 9/2000 |
| JP | 2002059363 | 2/2002 |
| JP | 2002542971 | 12/2002 |
| JP | 2005301247 | 10/2005 |
| JP | 2005338814 | 12/2005 |
| JP | 2007160845 | 6/2007 |
| JP | 2007326358 | 12/2007 |
| JP | 2011119776 | 6/2011 |
| TW | 200409700 | 6/2004 |
| WO | 2004033197 A2 | 4/2004 |
| WO | 2011048979 | 3/2013 |

OTHER PUBLICATIONS

Written Opinion of the International Searching Authority dated Mar. 27, 2014 for corresponding PCT/CN2013/077585, 7 pages.
International Preliminary Report on Patentability dated Oct. 10, 2015 for corresponding PCT/CN2013/077585, 9 pages.
Decision to Grant Japanese Patent Application No. 2016-520225, with English translation, 6 pages.
Decision to Grant Japanese Patent Application No. 2017-193494, with English translation, 6 pages.

* cited by examiner

BONDED ARTICLE OF THIN GLASS ON SUPPORT SUBSTRATE, PREPARATION METHOD AND USE THEREOF

CROSS REFERENCE TO RELATED APPLICATIONS

This application is a continuation of International Application No. PCT/CN2013/077585 filed Jun. 20, 2013, the entire contents of which are incorporated herein by reference.

BACKGROUND OF THE INVENTION

1. Field of the Invention

Generally speaking, the current invention is related to a laminate, particularly, the current invention is related to a laminate consisting of a substrate member and a support member, more particularly, the current invention is directed to a laminate article of a substrate member and a support member bonded by means of electrostatic force and mechanical pressure in the absence of any interlayer. Further, the current invention is directed to a preparation method of the said laminate and its use in OLED display, OLED lighting, thin film battery, PCB/CCL, capacitor, E-paper or MEMS/MOEMS.

2. Description of Related Art

Thin glass substrate having a thickness below 0.1 mm has found its potential applications in many fields for its thin thickness and light weight, such as, but not limited to, OLED displays, OLED lighting, thin film batteries, PCB/CCL, capacitors, E-paper, MEMS/MOEMS. During manufacture of such components or devices, thin glass substrate has to undergo a series of post treatments, for example, being coated with different functional layers.

Thin glass substrate needs positioning accurately in order to facilitate further processing, such as coating, photo lithography and so on, while it is difficult to handle and post-process due to its thin nature. Thin glass substrate is apt to warp or break under an external force, which highly influences both the coating quality and the productivity. The handling and processing of thin glass substrate therefore poses a great challenge for the current industry facilities, by which the application of thin glass substrate is greatly restricted.

One possible way to solve the technical problem during processing is to laminate a thin glass substrate with a thicker support substrate. The support substrate can provide protection for the thin glass substrate, and can prevent any deformation, even breakage during coating at elevated or high temperatures.

The support substrate normally can be any kind of rigid substrates including metal substrates, polymer substrates, glass substrates, ceramic substrates, etc. However, the support substrate should have a coefficient of thermal expansion (CTE) to match that of the thin glass substrate due to the change in temperature under the conditions of processing.

Generally, on one hand, a thin glass substrate is bonded to a support substrate by a suitable adhesion force, which ensures the rigidity of the laminate during processing. On the other hand, the processed thin glass substrate should be detached easily from the support substrate without residua on the surface of the thin glass substrate and breakage of the thin glass substrate. In addition, the lower costs are a requisite consideration for such bonding and de-bonding process.

Commonly, the bonding is attained by applying an adhesive between a thin glass substrate and a support substrate. An adhesive is usually a polymer based material such as acrylic resins, epoxy resins or silicones. The adhesion between a thin glass substrate and a support substrate can be achieved upon curing or hardening of a polymer interlayer under UV light at elevated temperatures. The polymer interlayer can provide adjustable adhesion and transparent appearance, which has been disclosed, for example, in US 2002/0090509, WO 2004/033197, US 2005/001201 and US 2011/0026236.

The polymer interlayer has the following disadvantages of affecting its processing at high temperatures and its operation requiring high precision:

High temperature instability: the common adhesive like acrylic and epoxy resins does not stand up to a temperature of 200° C., and even a thermal resistant silicone adhesive can withstand a temperature of 250° C. only for several minutes. The high temperature instability severely limits the high temperature processability of the thin glass substrate, which is an important advantage for a thin glass substrate over a polymer thin film.

Leaving residue after being detached from the support substrate: a support substrate is required during processing for most applications and the processed thin glass substrate needs removing from the support substrate for further treatment. For example, for some acrylic resins, the adhesion force relatively easily decreases when subject to high temperature treatment as the maximum use temperature of acrylic resins is lower than 200° C., while for high temperature resistant silicones, it is difficult to reduce the adhesion force through a cost-effective way. As such, the applications of the thin glass substrate are significantly limited such as forming a high temperature coating on the thin glass substrate with Indium Tin Oxide (ITO).

Contraction: During the hardening of adhesive the tensile, compressive or shear stress will produce on a thin glass substrate due to its contraction. In further processing, the thin glass will become easier to break under action of an external stress and the internal tensile, compressive or shear stress.

Surface waviness: The adhesive is applied to a support substrate by coating, printing, brushing and so on. The waviness of the adhesive is usually much higher than that of the thin glass substrate itself. Therefore, the high precision lithography may not be applicable.

Mismatching: The mismatch of the CTE between polymer and glass can result in an unexpected separation of the thin glass substrate and the support substrate or an increase in the risk of breakage of the thin glass substrate.

In addition to the polymer adhesive, other interlayers with specific properties can also be utilized for bonding a thin glass substrate and a support substrate, e.g., US2005001201 has disclosed an elastomer that can be adopted in between for such bonding. Although it is convenient to bond and de-bond the thin glass substrate, the costs of the elastomer with specific hardness and surface roughness are rather high. The potential outgassing during post processing may cause some problems, e.g., the local expansion of the thin glass substrate and the contamination of the processing chamber.

The disadvantages met by those bonded articles with interlayers can be overcome by bonding without any interlayer between the thin glass substrate and the support substrate. One method is in-situ fabrication and another is electrostatic adhesion. For the in-situ fabrication, a bonded article can be achieved via two melt batches with different compositions for the thin glass substrate and the support substrate, respectively. The interface without defects forms between them when melt cooling down, as disclosed in US 2011/111194. When the post processing is over, the support glass substrate can be removed by dissolution in an acid or by polishing. However, the fabrication is very complicated and not easy to make mass production.

Figure 1A:
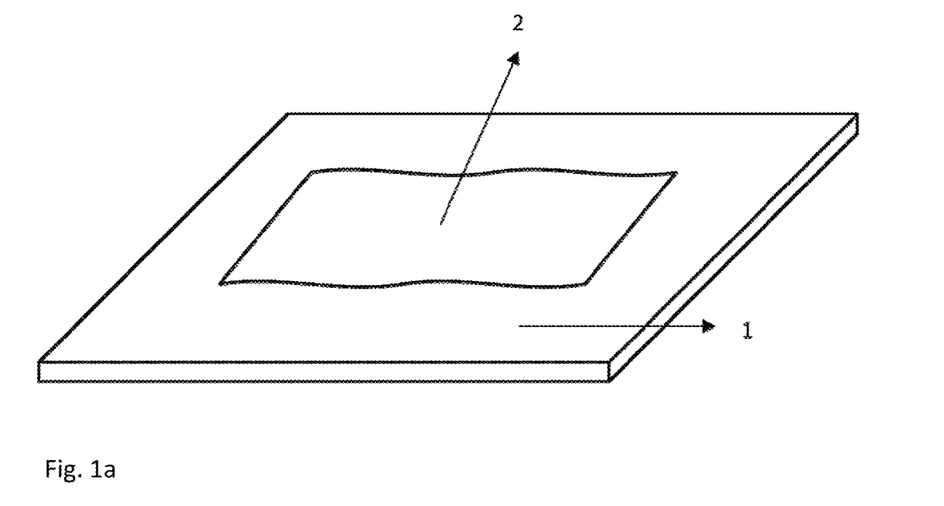
FIGS. 1a and 1b show the bubble formation in a bonded article.
Figure 1B:
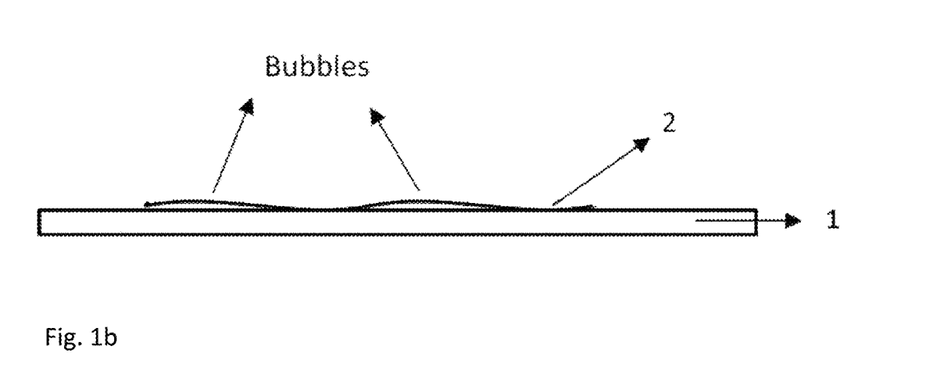

Electrostatic adhesion is an ideal option for the bonding of a thin glass substrate and a support substrate without any interlayer in between, which has other benefits, such as, simple apparatus, low cost and easy mass production, as disclosed in U.S. Pat. No. 6,735,982 and WO 2004/033197. The thin glass substrate and the support substrate can be electrostatically charged on the surface with opposite charges and then bonded by electrostatic adhesion. Unfortunately, unlike the bonding with an interlayer, defects especially such as air bubbles always exist in the bonding interface of the thin glass substrate and the support substrate by electrostatic adhesion, even the bonding process is implemented in ultra clean environment, which is not explained in the related references. In fact, this phenomenon can be well understood by considering the nature of the thin glass substrate. As illustrated in FIG. 1, before the electrostatic adhesion, surface fluctuation of a thin glass substrate always exists due to its small thickness and nature of flexibility. Once electrostatic charging is applied on the surface of the support substrate and/or the thin glass substrate, some concave parts of the thin glass substrate will be adhered to the support substrate prior to other convex parts during bonding due to the surface fluctuation, causing air to be trapped in these regions with bubbles forming.

Bubbles in the bonding interface are very harmful to the post-processing of the thin glass substrate. For example, during high temperature coating process, the bubbles would expand and the coating has lower quality on those sites containing bubbles after cooling due to shrinkage. Furthermore, under high vacuum, the possibility of breakage of the thin glass substrate is increased. In some circumstances, e.g., during the cleaning or laminating process, where an external pressure is applied, the existence of bubbles in the bonding interface would also cause the breakage of the thin glass substrate, which makes the continuous industrial production even more difficulty.

SUMMARY

Inventors have found a way after a long period of time of efforts to address the disadvantages mentioned above: defects such as bubbles or inclusions in the bonding interface through bonding with or without an interlayer, or solely using electrostatic force, and limited use of the temporary bonded glass-on-support substrate with polymers or other organic adhesive as the interlayer due to the low temperature stability of polymers, and surface distortions caused by application of the said interlayer.

In this invention, a novel method is disclosed to produce a bonded article of a thin glass substrate and a support substrate without defects by both electrostatic adhesion and external pressure that are combined in a unique bonding process. Also, the present invention discloses a bonded article of a thin glass substrate and a support substrate without an interlayer in between and without defects between the thin glass substrate and the support substrate.

In the first aspect of the current invention, a method for making a bonded article is disclosed, comprising: providing a support member (1) having a first surface (1a) and a second surface (1b), providing a flexible substrate member (2) having a first surface (2a) and a second surface (2b), winding the flexible substrate member (2) onto a roller (3), and charging the support member (1) and/or the flexible substrate member (2), bonding one of the first and second surfaces of the support member to one of the first and second surfaces of the substrate member gradually under rotation and movement of the roller by means of electrostatic force and mechanical pressure exerted by the roller.

In one embodiment, at least one surface of the support member and the substrate member is electrostatically charged.

In another embodiment, the electrostatic charge is generated by applying a polarized voltage.

In still another embodiment, a voltage of at least ±5 kV and no more than ±100 kV is applied.

In yet another embodiment, the distance between the electrostatic bar and the bonding surface of the support substrate is less than 20 cm, less than 10 cm, less than 5 cm, or less than 1 cm.

In a further embodiment, the charging time lasts for a period of time of less than 1 minute, less than 30 seconds, less than 20 seconds, or less than 10 seconds.

In still yet a further embodiment, the mechanical pressure is not less than 0.1 MPa and not greater than 10 MPa.

In some other embodiment, the mechanical pressure is applied at a speed of 0.05 rps to 5 rps.

In a specific embodiment, the mechanical pressure is applied by a rolling process using at least one roller.

In other embodiment, at least the surface of the roller is comprised of metal, plastic or rubber.

In another embodiment, before the bonding process the thin glass substrate is adhered to a device with curved surface.

In another embodiment, the mechanical pressure is applied by moving of a device with curved surface.

In yet another aspect of the invention, the substrate member is wound onto the surface of the roller or the device by water, alcohol, organic film, or adhesive with lower stickiness than the bonding force introduced by electrostatic adhesion.

In yet another aspect of the invention, the substrate member is adhered to the surface of the roller or the device by vacuum.

In still another embodiment, the support substrate is provided thereon with or without through holes or pores.

In an embodiment, the bonding is effected by the external pressure applied from rotation of the roller and movement of either the substrate member or the support member.

In the current invention, an article is also disclosed consisting of: a support member (1) having a first surface (1a) and a second surface (1b), a flexible substrate member (2) having a first surface (2a) and a second surface (2b), wherein one of the first and the second surfaces of the support member is bonded to one of the first and the second surfaces of the substrate member through the method as disclosed here, wherein the substrate member and the support member are bonded by the remaining electrostatic force, wherein no significant defects visible with naked eyes occur between the bonded surfaces, wherein the total thickness of the support member and the flexible substrate member bonded is at least 0.4 mm.

In an embodiment, said defects are bubbles or inclusions.

In a further embodiment, no defects are bigger than 10 μm.

In still another embodiment, the defect density is less than $5/m^2$.

In an embodiment, the electrostatic voltage in the bonded article is not higher than 100 kV, not higher than 10 kV, not higher than 1 kV, but not less than 1 V.

In yet another embodiment, the thickness of the substrate member is less than 0.5 mm, less than 0.2 mm, less than 0.1 mm, less than 70 microns, less than 50 microns, less than 30 microns, but not less than 0.01 microns. In still yet another embodiment, the substrate member is comprised of one of glass, glass ceramic or ceramic.

In one embodiment, the substrate member can be chemically toughened glass.

In a further aspect of the invention, the substrate member is one selected from the group consisting of borosilicate, aluminosilicate and soda-lime produced by down draw, float, micro-float, slot draw or fusion draw.

In another aspect of the invention, the support member is one selected from the group consisting of glass, glass ceramic, ceramic, metal or plastic.

In still another aspect of the invention, the support substrate is provided thereon with or without through holes or pores.

In an embodiment, the bonded article does not lose the adhesion when heated up to 550° C., up to 450° C., up to 350° C., or up to 250° C.

In another embodiment, the bonded article can be coated with an ITO layer or an OLED functional layer.

In the current invention, the bonded articles or the articles made by the methods as set forth above are used for handling and transportation of a thin substrate, especially the post processing of a thin substrate such as coating, lithography, patterning, structuring.

In the current invention, the bonded articles or the articles made by the methods as set forth above are used for applications in OLED display, OLED lighting, thin film battery, PCB/CCL, capacitor, E-paper or MEMS/MOEMS and any other application wherein a thin glass substrate or cover is used.

Further in the current invention, a method for de-bonding the bonded article is also recorded, wherein the substrate member can be peeled off from the support member by tape (4) dragging with or without neutralization of electrostatic charges by an ionizer (5).

In a further embodiment, the substrate member can be peeled off from the support member by pressure from compressed water or gas via the through holes or pores of the support member.

There is no additional adhesives or interlayers between the thin glass substrate and the support substrate.

The advantage of defect-free bonded articles is beneficial to the post processing of the thin glass substrate. If small bubbles or inclusions are present in between, the machining accuracy will be affected greatly and highly possibly useless functional dots or defects will be formed on the corresponding sites, resulting in the reduced quality of products. For example, when coating is performed under high temperature, the size of air bubbles would be enlarged and the corresponding sites on the thin glass substrate are not flat enough for an accurate lithography process. Additionally, breakage easily happens, especially when a lamination process is applied under the action of a further external force.

Dust particles on the glass surface and the surface fluctuation of the thin glass substrate are two main reasons causing the formation of bubbles during bonding. The former can be avoided by bonding in a clean environment. The latter can be overcome by applying an appropriate pressure in a unique way during the electrostatic adhesion process, as demonstrated in the present invention. Only in this way can the defect-free bonded article be achieved.

DETAILED DESCRIPTION

The thin glass substrate has been of interests for miniaturization of electronic products by reducing thickness or weight. When the glass thickness is reduced to 0.3 mm, especially 0.1 mm, the conventional processing setup does not work, what is more, the processing including cutting, edge working, cleaning and coating is also challenged. In this circumstance, the issue can be dealt with by bonding the thin glass substrate to a stiff support substrate, wherein a preliminary adhesion between the thin glass substrate and the support substrate can be created by electrostatic force.

It is clear to see that a bonded article formed by electrostatic force can be subjected to high temperature treatment compared to that obtained by use of an interlayer or adhesive. Further, the bonded article can be easily detached without residua.

Residua dust particles on the surfaces of either the thin glass substrate or the support substrate can affect the removal of air during bonding, resulting in the formation of air bubbles between the thin glass substrate and the support substrate in the bonded article. Therefore, the glass and support substrates need cleaning and the whole processing should be performed in a cleaning room.

The existence of air bubbles in the bonding interface would greatly and negatively affect the subsequent processing of bonded articles. For example, when the bonded article is subjected to high temperature ITO coating, air bubbles will expand with forming of a low quality of coating that even breaks upon cooling. Also, bubbles will make cleaning of bonded articles more difficulty.

For the purpose of obtaining a defect-free bonded article, the following three steps are necessary: cleaning of both the thin glass substrate and the support substrate, electrostatic charging the bonding surfaces of the support substrate and/or the thin glass substrate, and pressure supported electrostatic adhering of the thin glass substrate onto the support substrate.

For the purpose of a defect-free article, the difference in the CTE between the support substrate and the thin glass substrate is lower than 20%, 10%, or even 5%.

The thickness of the support substrate is less than 5 mm, less than 3 mm, less than 1 mm, less than 0.7 mm, less than 0.6 mm, or less than 0.5 mm.

The edge of the support substrate may be chamfered, ground or etched after cutting.

Figure 2:
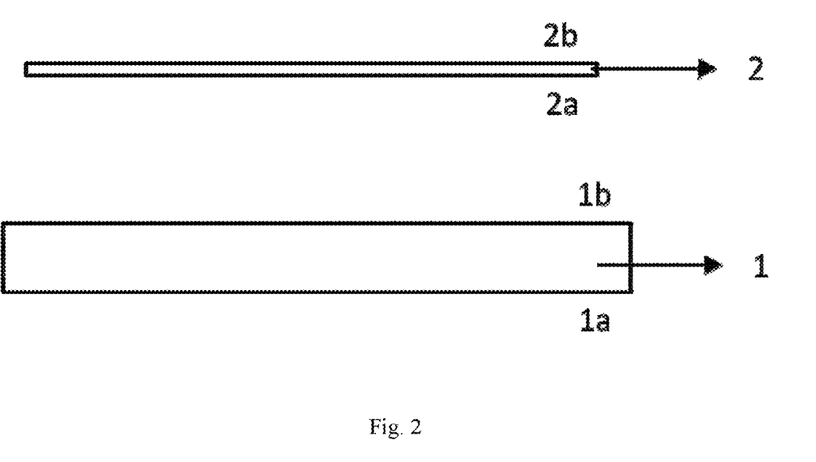
FIG. 2 shows the thin glass substrate and the support substrate.

The thin glass substrate and the support substrate are cleaned and dried, as shown in FIG. 2.

Figure 3:
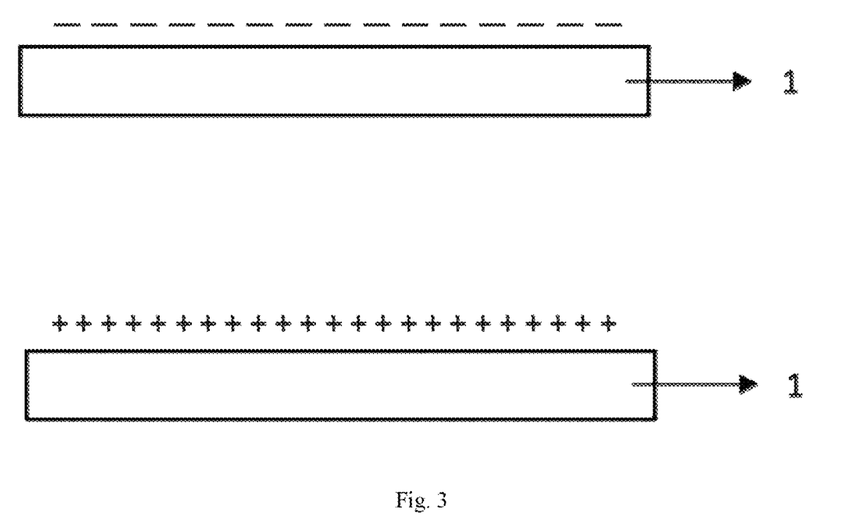
FIG. 3 shows electrostatic charging on the surface of the support substrate.

After cleaning and drying the bonding surface is charged by an electrostatic generator. In one embodiment, the bonding surface of the support substrate is charged with negative (marked by "−") or positive (marked by "+") charges, as exemplified in FIG. 3. In another embodiment, the surface of the thin glass substrate is charged with negative or positive charges. In a further embodiment, both surfaces of the support substrate and the thin glass substrate are charged with opposite charges for further bonding.

The electrostatic voltage for charging is higher than 5 kV, higher than 10 kV, higher than 20 kV, higher than 30 kV, higher than 40 kV or higher than 50 kV.

The distance between the electrostatic bar and the bonding surface of the support substrate is less than 20 cm, less than 10 cm, less than 5 cm or less than 1 cm, and the time for charging lasts for less than 1 minute, less than 30 seconds, less than 20 seconds, or less than 10 seconds. When a higher voltage is applied, a bigger distance and a shorter charging time should be adopted.

Figure 4A:
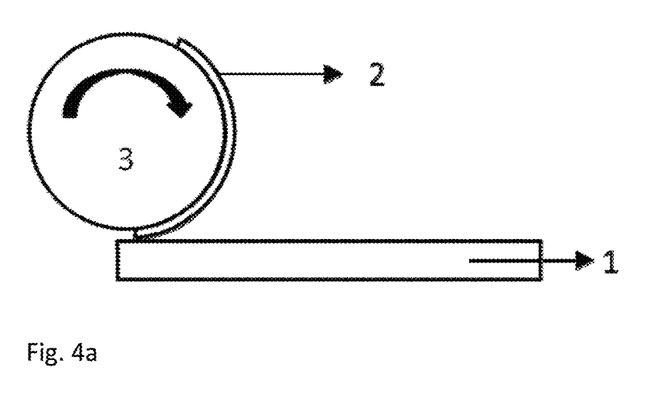
FIGS. 4a and 4b show the cross sectional view of the "pressure supported electrostatic adhesion."
Figure 4B:
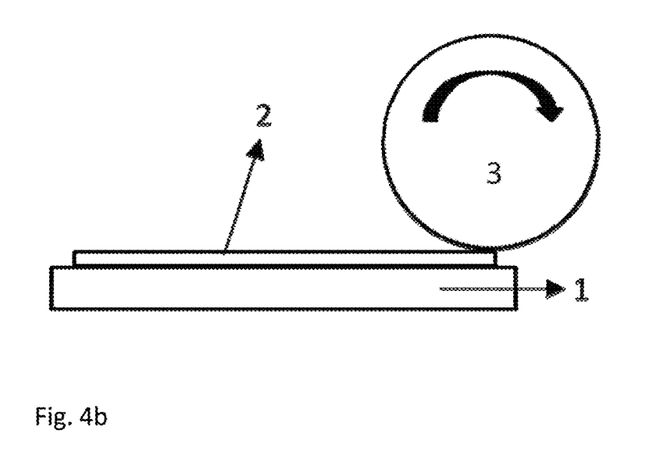
Figure 5A:
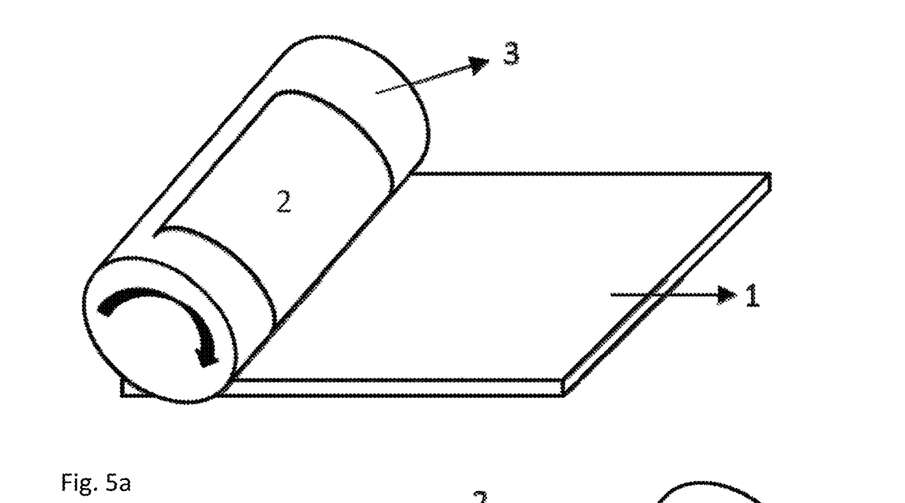
FIGS. 5a and 5b show the side view of the "pressure supported electrostatic adhesion."
Figure 5B:
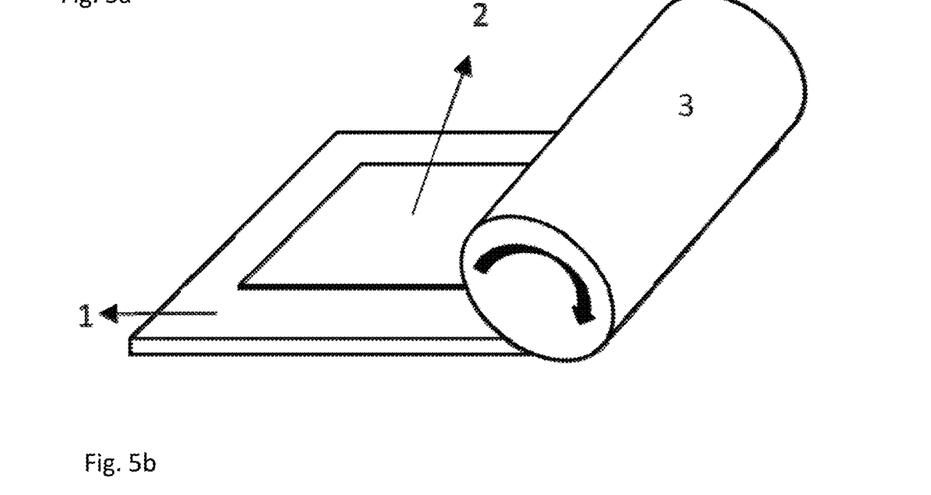

After electrostatic charging, the thin glass substrate and the support substrate are bonded together via a "pressure supported electrostatic adhesion" process having the synergistic effect of both electrostatic adhesion and external pressure, as shown in FIGS. 4 and 5. Before bonding, the thin glass substrate is wound on a roller (the rotation direction is marked by curved arrows) to avoid any surface fluctuation, where an intermediate with low stickiness is applied between the thin glass substrate and the roller. The sticking force between the intermediate and the thin glass substrate should be lower than the bonding force introduced by further electrostatic adhesion to facilitate the subsequent bonding process. The roller can be made of stainless steel, copper, aluminum alloy or rubber. The radius of the roller can be bigger than 3 cm, bigger than 5 cm, bigger than 10 cm, bigger than 20 cm, bigger than 50 cm, bigger than 100 cm as long as the radius of the roller is appropriate to avoid any breakage of the thin glass substrate.

In one embodiment, the thin glass substrate is wound on a movable device with curved surface instead of a roller. The device can be, e.g., arched, sectorial, ellipsoidal, or any other shape but with curved surface. It should also have appropriate curvature radius to facilitate the adhesion of the thin glass substrate.

In one embodiment, water is used to wind the thin glass substrate on the roller. In another embodiment, alcohol is used to wind the thin glass substrate on the roller. In still another embodiment, a thin organic film, e.g., the PET film, is used to wind the thin glass substrate on the roller. It should be noted that the radius of the roller should be appropriate to avoid the breakage of the thin glass substrate.

In another embodiment, thin glass substrate is adhered to the roller by vacuum.

By the "pressure supported electrostatic adhesion," it means that, during electrostatic adhesion, additional force is concurrently applied on the thin glass substrate gradually from one edge to the other opposite edge via a rolling roller, to allow the thin glass substrate to contact the support substrate and bond to its surface, until the bonding process completes.

When the "pressure supported electrostatic adhesion" is applied, one edge of the thin glass substrate is first bonded to the support substrate by both the electrostatic adhesion from the surfaces of the support substrate and/or the thin glass substrate, and the pressure from the roller. With the rotation and movement of the roller, the thin glass substrate is gradually bonded to the support substrate from one edge to the other edge. As illustrated in FIGS. 4 and 5, there is always only one straight line on the thin glass substrate that is in the status of being bonded, which allows air to be easily squeezed out of the bonding interface to achieve an air-free bonded article during the whole process of bonding.

In one embodiment, the roller is not only in rotation but also in movement, which allows the thin glass substrate to be gradually bonded to the surface of the support substrate via a "pressure supported electrostatic adhesion" process.

In another embodiment, only the roller is in rotation and the support substrate is in movement but in different direction from the above case, which also allows the thin glass substrate to be gradually bonded to the surface of the support substrate via a "pressure supported electrostatic adhesion" process.

Figure 6A:
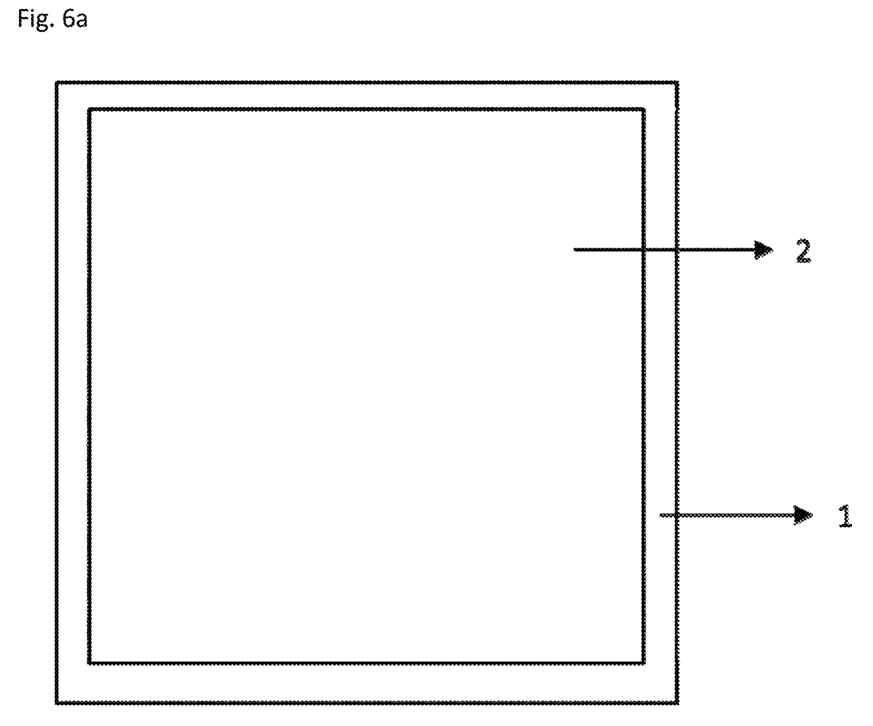
FIGS. 6a and 6b show top and side views of a bonded article.
Figure 6B:
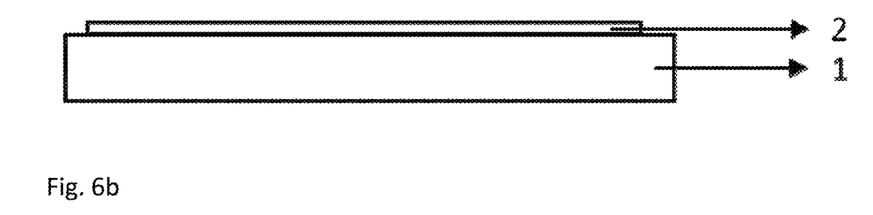

The schematic diagram for the bonded article is shown in FIGS. 6a and 6b. The electrostatic voltage in the bonded article is measured on an electrostatic field meter, which can reach as high as 100 kV for an as-bonded article and will gradually decrease after several days. However, the remaining electrostatic field can still keep the thin glass substrate and the support substrate tight. For example, in the case of magnetic sputtering, the remaining electrostatic voltage in the bonded article is much helpful in maintaining the bonding as the presence of magnetic particles and vacuum during sputtering tends to make the bonded article detached.

In an embodiment, the bonding process is carried out in vacuum.

In another embodiment, after cleaning and drying, the electrostatic charging on the support substrate surface and the pressure applying to the thin glass substrate can also be carried out concurrently for the purpose of bonding.

An unexpected technical effect of absence of any bubbles in the bonded article has been effected by the synergistic effect of electrostatic adhesion and external pressure, which cannot be achieved only by electrostatic adhesion because of surface fluctuation of the thin glass substrate thanks to its small thickness and nature of flexibility. Once the electrostatic charging is applied to the surfaces of the support substrate and/or the thin glass substrate, the concave regions of the thin glass substrate will be adhered to the support substrate prior to the convex regions, causing air to be trapped in these regions with bubbles forming. The way of pressure applying is key to avoiding formation of air bubbles. The "pressure supported electrostatic adhesion" provides an efficient and reliable process to make defect-free bonded articles, where air can be easily cleared out of the bonding surfaces.

In this circumstance, the criterion for the defect-free article is that one can't observe any bubbles, dusts or other defects with naked eyes.

The smooth surface of the thin glass substrate will be helpful in bonding. The roughness of the thin glass substrate is less than 10 nm, less than 5 nm, or less than 2 nm.

The pressure applied for bonding is higher than 0.1 MPa, higher than 0.5 MPa, higher than 1 MPa, or higher than 5 MPa.

The thickness of the thin glass substrate is not thicker than 0.5 mm, not thicker than 0.1 mm, not thicker than 70 microns, not thicker than 50 microns, or not thicker than 30 microns, and the total thickness of the bonded article is in the range of 0.5 mm to 5 mm, in the range of 0.5 mm to 3 mm, in the range of 0.5 mm to 2 mm, in the range of 0.5 mm to 1 mm, or in the range of 0.5 mm to 0.7 mm.

The thin glass substrate is borosilicate glass, aluminosilicate glass, soda-lime glass, produced by down draw, float, micro-float, slot draw or fusion draw.

The support substrate can be glass, glass ceramics, ceramics, metal or plastic, depending on various applications. For example, when the thin glass substrate is to be subjected to high temperature processing, it's better to choose the same type of glass as the support substrate in order to avoid the detaching of the thin glass substrate from the support substrate induced by the difference in the CTE between the thin glass substrate and the support substrate.

Figure 7:
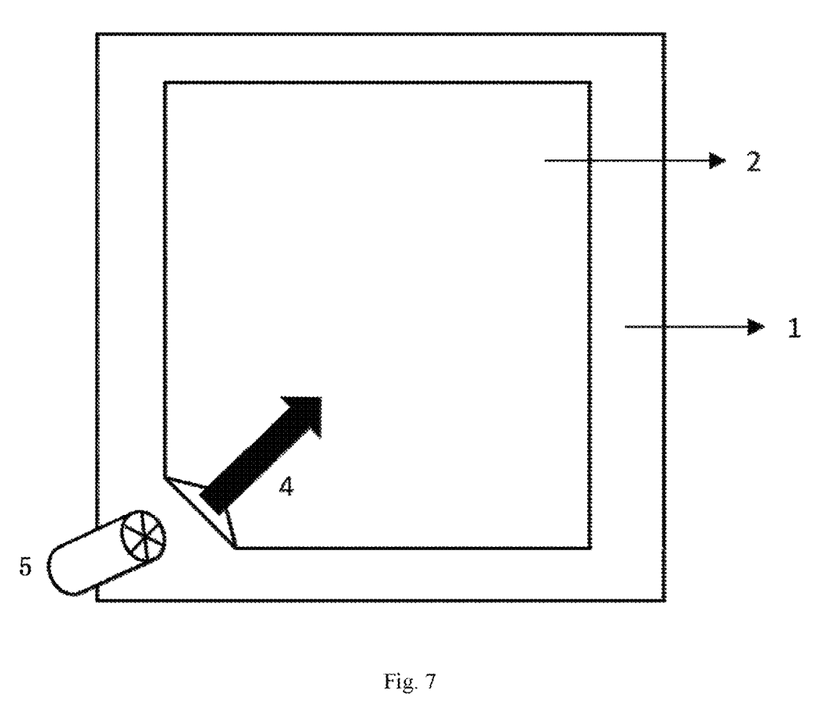
FIG. 7 shows the de-bonding of a thin glass substrate by tape dragging and ionizer neutralization.

When the post processing of the bonded article is finished, the thin glass substrate with functional layers needs to be peeled off from the support substrate. In one embodiment, a tape (4) is pasted on one corner of the thin glass substrate and the thin glass substrate is slowly dragged out of the support substrate. During this process an ionizer (5) blows on the bonding interface to neutralize the charges so as to facilitate the de-bonding process, as shown in FIG. 7. The drag force for the tape is bigger than 0.1 N, bigger than 0.5 N, bigger than 1 N, bigger than 5 N, or bigger than 10 N.

Figure 8:
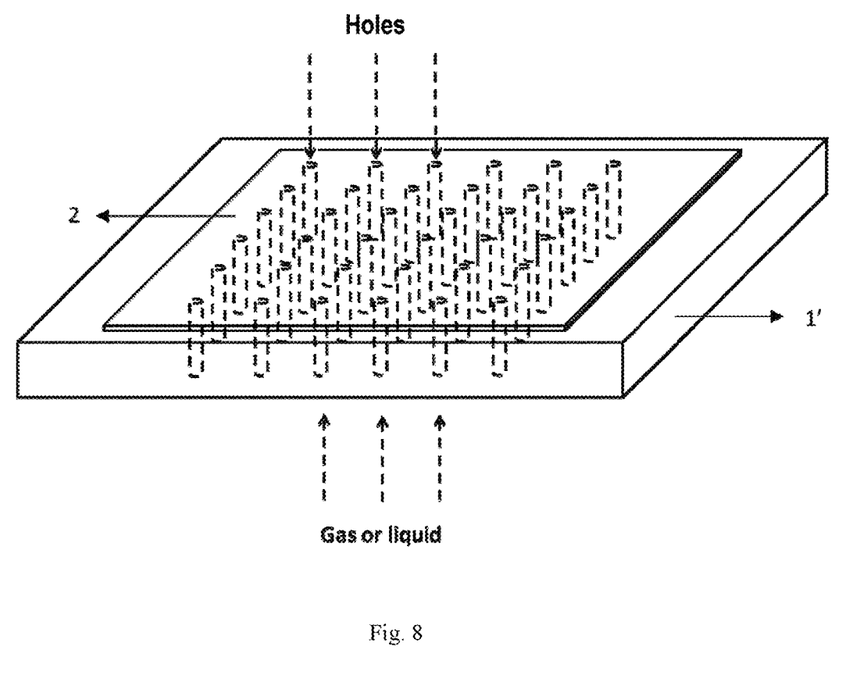
FIG. 8 shows the de-bonding of a thin glass substrate by introducing gas or liquid through the holes on the support substrate and striking the bonding interface.
Figure 9:
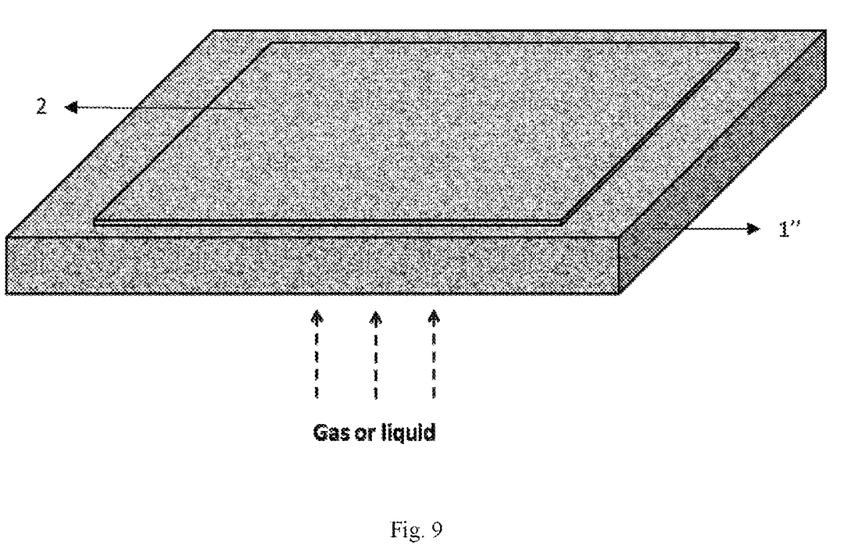
FIG. 9 shows the de-bonding of a thin glass substrate by introducing gas or liquid through the pores inside porous ceramics and striking the bonding interface

The support substrate with holes or pores can also make a contribution to easy de-bonding. In one embodiment, drilled glass (1') or porous ceramics (1") can be used as the support substrate for bonding. After the post processing of bonded articles is finished, gas or liquid is introduced from those holes or pores to apply a force towards the thin glass substrate and force it to detach from the support substrate, as shown in FIG. 8 and FIG. 9. The diameter of the hole is less than 1 mm, less than 0.5 mm, less than 0.1 mm, or less than 0.05 mm. The porosity of porous ceramics is higher than 30%, higher than 50%, higher than 70%, or higher than 80%.

EXAMPLE 1

The alumino-borosilicate thin glass substrate AF32 having a thickness of 0.05 mm is subjected to an ITO coating process to serve as the substrate of OLED display and lighting. For the purpose of facilitating both treating and coating processes, the thin glass substrate is bonded to the alumino-borosilicate glass AF32 having a thickness of 0.5 mm by a "pressure supported electrostatic adhesion" process.

Figure 10:
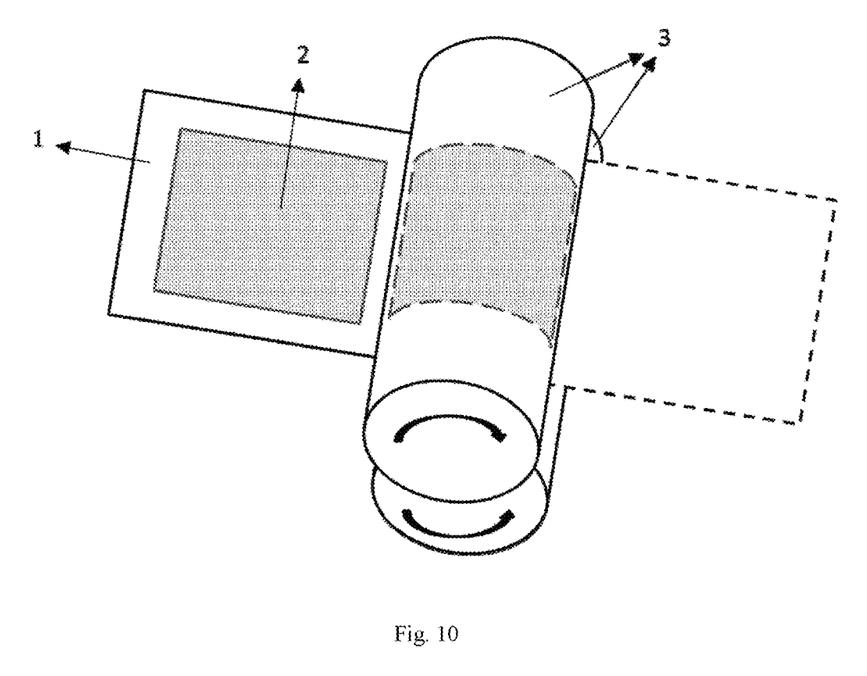
FIG. 10 shows the "pressure supported electrostatic adhesion" of a thin glass substrate and a support substrate via a lamination process.

After cleaning both the thin glass substrate and the support substrate, the latter is charged under an electrostatic voltage of −20 kV. The distance between the electrostatic bar and the charging surface is 2 cm and the charging lasts for 20 seconds. The thin glass substrate AF32 is first wound on the upper roller having a radius of 125 mm by adhesion of water on the roller surface. Then, a "pressure supported electrostatic adhesion" is conducted by a lamination process, where a pressure of 1 MPa is applied, as shown in FIG. 10. With the rotation of a pair of rollers, the support substrate moves from right to left and the thin glass substrate AF32 is gradually loaded and adhered to the surface of the support substrate, from one edge to the other. During the whole bonding process, there is always only one straight line on the thin glass substrate that is in the status of being bonding, with the result of no bubbles existing in the bonded article. The electrostatic voltage in the as-bonded article is 2 kV and decreases to 200 V after 3 days, which still keeps the thin glass substrate tight onto the support substrate. The post processing of the thin glass substrate is involved with an ITO coating process under a temperature of 250° C. and the deposition of OLED function layers. It has been found that the bonded article squarely meets the requirements of coating. After all processes have finished the thin glass substrate is peeled off from the support substrate by dragging of a tape with a force of 10 N from one corner. Thereafter, an OLED unit composed of a thin glass, an electrode and a function layer is attained.

EXAMPLE 2

The thin glass substrate D263T is used as the cover and the substrate of some optical sensors, which requires a sensitive layer to be formed on the thin glass substrate. In this example, the D263T with a thickness of 0.05 mm and a porous ceramic boron nitride with a thickness of 0.5 mm are chosen as the thin glass substrate and the support substrate, respectively. Said support substrate has a porosity of 50-70% and the pores are open and connected with each other to facilitate the de-bonding process. After cleaning of both the thin glass substrate D263T and the porous BN support substrate, the latter is charged under an electrostatic voltage of 30 kV. The distance between the electrostatic bar and the charging surface is 5 cm and the charging lasts for 10 seconds. Then, the thin glass substrate D263T is wound on the roller having a radius of 100 mm by adhesion of the PET film on the surface of a rubber roller. Then, a "pressure supported electrostatic adhesion" is conducted, wherein the roller is in rotation and in movement as well. Under the synergistic effect of electrostatic adhesion and roller pressure, the thin glass substrate D263T is gradually bonded to the surface of the porous BN support substrate without bubbles in between. Thereafter, the bonded article is subjected to a coating process to form a sensitive layer on the thin glass substrate D263T. Afterwards, a de-bonding process is carried out. Compressed air is introduced into the porous BN support substrate and thus the thin glass substrate D263T is detached from the support substrate by air pressure, without damaging of both the thin glass substrate and the functional layer thereon.

EXAMPLE 3

The thin glass substrate AF32 is bonded to the support substrate AF32 with through holes. These holes with a diameter of 0.5 mm are uniformly distributed on the support substrate AF32 at an interval of 10 mm between each other. After cleaning and drying of both the thin glass substrate and the support substrate, the latter is charged under an electrostatic voltage of −30 kV. The distance between the electrostatic bar and the charging surface is 10 cm and the charging lasts for 40 seconds. Then, the thin glass substrate AF32 is wound on a roller with a radius of 100 mm by adhesion of alcohol on the surface of the roller. During the "pressure supported electrostatic adhesion" process, the rotation and movement of the roller makes the thin glass substrate AF32 gradually to be bonded to the charged surface of the drilled support substrate glass, without any bubbles in the bonding interface. Afterwards, the bonded article is subjected to a CVD process to make a conductive coating on the thin glass substrate AF32. A de-bonding process is then carried out.

The peeling force comes from either the strike of gas or liquid or the mechanical action via the holes, without damaging of the thin glass substrate and the functional layer thereon.

EXAMPLE 4

For the application of optical lens, the thin glass substrate D263T having a thickness of 0.1 mm is first chemically toughened at 400° C. for 3 h, and then is bonded onto a thicker D263T glass with a thickness of 0.4 mm to facilitate its post-processing, e.g., coating or lithographing. After the cleaning and drying of both the chemically toughened thin glass substrate and the support substrate, one surface of the support substrate is charged under an electrostatic voltage of 20 kV via an electrostatic generator. The distance between the electrostatic bar and the charging surface is 8 cm and the charging lasts for 50 seconds. The chemically toughened thin glass substrate is then wound onto a device by an adhesive with low stickiness, and the device has an arched surface with a curvature radius of 40 cm. Then, a "pressure supported electrostatic adhesion" is conducted. With rotation of the device, the chemically toughened thin glass substrate is gradually bonded onto the charged surface of the support substrate under the synergistic effect of the electrostatic adhesion and the pressure from the moving device. No defects are noticed in the bonding interface of the final bonded article. After being coated with an optical film, the chemically toughened thin glass substrate is peeled off from the support substrate by dragging of a tape with a force of 15 N from one edge. Thus, the chemically toughened and coated thin glass cover for optical lens is obtained.

COMPARISON EXAMPLE

Figure 11A:
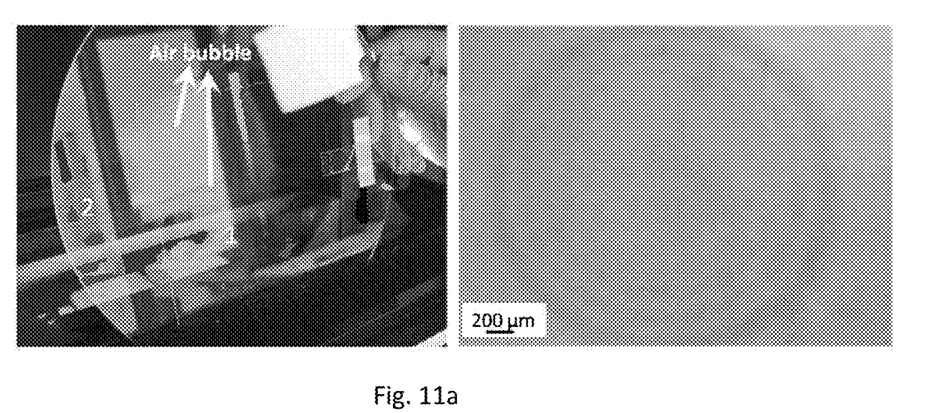
FIGS. 11a and 11b show comparison difference in the finished produced by the common electrostatic adhesion and the "pressure supported electrostatic adhesion."
Figure 11B:
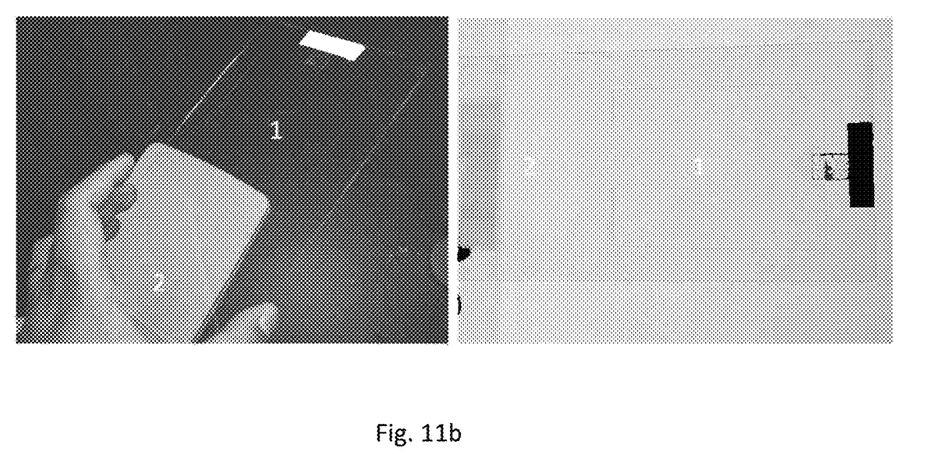

The comparison of common electrostatic adhesion and "pressure supported electrostatic adhesion" of the present invention is exemplified in FIG. 11. The thin glass substrate AF32 is bonded to the support substrate AF32 by common electrostatic adhesion, causing air bubble to form in the bonding interface, as shown in FIG. 11a. Normally, the existence of dusts can cause the formation of air bubbles. However, even under cleaning environment, air bubbles without dusts inside can still form by common electrostatic adhesion. It is the surface fluctuation of the thin glass substrate that should be responsible for the bubble formation. As observed with an optical microscope, the interference patterns are produced in the bonded article due to the presence of the bubbles although no dust inside the bubbles is found, as shown in FIG. 11a. By comparison, the defect-free bonded article can be achieved via a "pressure supported electrostatic adhesion" process, which ensures that air can be squeezed out of the bonding interface by the synergistic effect of electrostatic adhesion and external pressure. One example is shown in FIG. 11b. Under a reflection or transmission light, it is revealed that no bubbles exist in the bonded article made by the claimed unique method. Furthermore, the way of pressure applying is very important and only the rigid bonding can avoid the formation of bubbles during bonding. That's just the technical effects produced by the so called "pressure supported electrostatic adhesion" of the present invention.

What is claimed is:
1. A method for making a bonded article, comprising:
providing a stiff support member having a first surface and a second surface and a thickness of less than 1 mm, wherein the support member includes a material selected from the group consisting of glass, glass ceramic, and ceramic;
providing a separate, flexible substrate member having a first surface and a second surface, wherein the flexible substrate member includes a material selected from the group consisting of glass, glass ceramic, and ceramic, wherein the flexible substrate member is thinner than the support member, wherein the flexible substrate member has a thickness of less than 0.2 mm;
winding the flexible substrate member onto a roller or a device with curved surface;
charging the support member and/or the flexible substrate member; and
bonding one of the first and second surfaces of the support member to one of the first and second surfaces of the flexible substrate member gradually under rotation and movement of the roller or the device with curved surface by both electrostatic force and mechanical pressure of not less than 0.1 MPa and not greater than 10 MPa exerted by the roller or the device with curved surface and without an adhesive or interlayer to provide a bonded thickness of at least 0.4 mm.

2. The method according to claim 1, wherein at least one surface of the support member and the flexible substrate member is electrostatically charged.

3. The method according to claim 2, wherein the electrostatic charge is generated by applying a polarized voltage.

4. The method according to claim 3, wherein the polarized voltage comprises a voltage of at least ±5 kV and no more than ±100 kV.

5. The method according to claim 3, wherein the electrostatic charge is applied with a distance between an electrostatic bar and the bonding surface of the support member of less than 20 cm.

6. The method according to claim 1, wherein the charging lasts for a period of time of less than 1 minute.

7. The method according to claim 1, wherein the mechanical pressure is applied at a speed of 0.05 rps to 5 rps.

8. The method according to claim 1, wherein at least the surface of the roller or the device with the curved surface comprises a material selected from the group consisting of metal, plastic, and rubber.

9. The method according to claim 1, wherein the substrate member is wound onto the surface of the roller or the device with the curved surface with a material selected from the group consisting of water, alcohol, organic film, and adhesive with low stickiness.

10. The method according to claim 1, wherein the support member is provided without through holes or pores.

11. The method according to claim 1, wherein the support member is provided with through holes or pores.

12. The method according to claim 11, further comprising peeling the flexible substrate member off from the support member by pressure from compressed water or gas via the through holes or pores.

13. The method according to claim 1, wherein the bonding is effected by the external pressure produced from rotation of the roller and the movement of either the flexible substrate member or the support member.

14. The method according to claim 1, further comprising peeling the flexible substrate member off from the support member by tape dragging with or without neutralization of electrostatic charges by an ionizer.

15. An article, comprising:
a stiff support member having a first surface and a second surface and a thickness of less than 1 mm, wherein the support member includes a material selected from the group consisting of glass, glass ceramic, and ceramic; and a flexible substrate member having a first surface and a second surface, wherein the flexible substrate member includes a material selected from the group consisting of glass, glass ceramic, and ceramic, wherein the flexible substrate member is thinner than the support member, wherein the flexible substrate member has a thickness of less than 0.2 mm;

wherein one of the first and the second surfaces of the support member is bonded to one of the first and the second surfaces of the flexible substrate member by both electrostatic force and mechanical pressure of not less than 0.1 MPa and not greater than 10 MPa and substantially free of an adhesive or interlayer, wherein no significant defects visible with naked eyes occur between the bonded surfaces, and wherein the support member and the flexible substrate member have a bonded thickness of at least 0.4 mm.

16. The article according to claim 15, wherein no defects are bigger than 10 µm.

17. The article according to claim 15, wherein the defect density is less than $5/m^2$.

18. The article according to claim 15, wherein the flexible substrate member has a thickness that is less than 0.5 mm, but not less than 0.01 µm.

19. The article according to claim 15, wherein the flexible substrate member is a glass selected from the group consisting of borosilicate glass, aluminosilicate glass, soda-lime glass, and chemically toughened glass.

20. The article according to claim 15, wherein the flexible substrate member is a glass selected from the group consisting of down draw glass, float glass, micro-float glass, slot draw glass, and fusion draw glass.

21. The article according to claim 15, wherein the support member is glass.

22. The article according to claim 15, wherein the support substrate comprises through holes or pores.

23. The article according to claim 15, wherein the support substrate is provided without through holes or pores.

24. The article according to claim 15, wherein the bond does not lose adhesion when heated up to 550° C.

25. The article according to claim 15, further comprising a coating comprising an ITO functional layer or an OLED functional layer.

26. The article according to claim 15, wherein the article is configured for a use selected from the group consisting of an OLED display, an OLED light, a thin film battery, a PCB, a CCL, a capacitor, an electronic paper, a MEMS, a MOEMS, and handling and transportation of thin flexible substrates.

27. The method according to claim 1, wherein the flexible substrate member is a glass selected from the group consisting of borosilicate glass, aluminosilicate glass, soda-lime glass, and chemically toughened glass.

28. The method according to claim 1, wherein the flexible substrate member is a glass selected from the group consisting of down draw glass, float glass, micro-float glass, slot draw glass, and fusion draw glass.

* * * * *